April 19, 1955     H. N. ARNOLD     2,706,362
RODENT EXTERMINATING APPARATUS
Filed Oct. 19, 1953     2 Sheets-Sheet 1
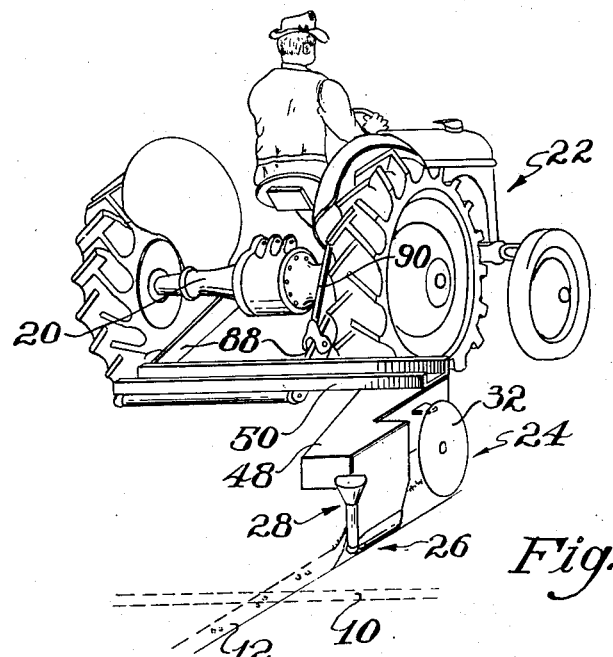
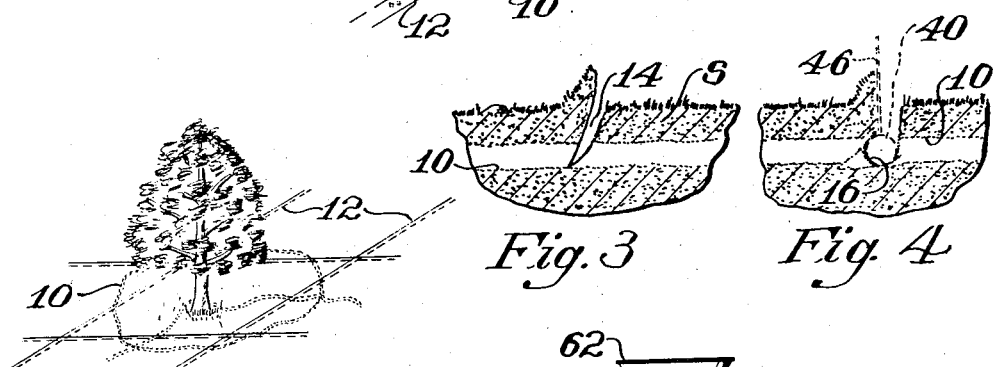
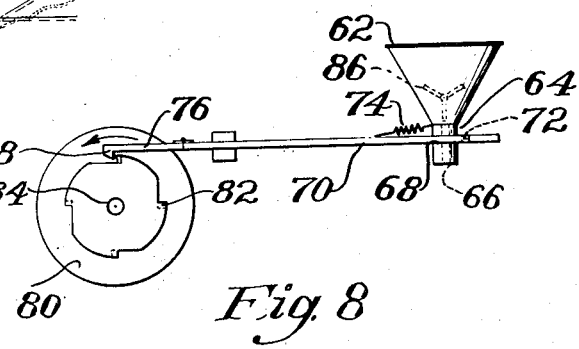
Inventor
Henry N. Arnold
by Roberts, Cushman & Grover
Att'ys.

April 19, 1955  H. N. ARNOLD  2,706,362
RODENT EXTERMINATING APPARATUS
Filed Oct. 19, 1953  2 Sheets-Sheet 2

Inventor
Henry N. Arnold
by Roberts, Cushman & Grover
Attys.

United States Patent Office 2,706,362
Patented Apr. 19, 1955

2,706,362

RODENT EXTERMINATING APPARATUS

Henry N. Arnold, Greene, R. I.

Application October 19, 1953, Serial No. 386,940

7 Claims. (Cl. 43—124)

This invention relates to the care of orchards and more especially to an apparatus for exterminating burrowing rodents which attack the roots of trees beneath the ground. The present application is a continuation-in-part of my application Serial No. 329,695, filed January 5, 1953, which is now abandoned.

A great deal of havoc is caused in orchards by burrowing rodents who eat the buried unexposed roots of the trees. These animals make numerous tunnels or runways in the sod which they use habitually to reach the roots of the trees. The root tips seem to be preferred hence the tunnels which are usually evidenced by faint depressions in the sod generally encircle each tree in a more or less circular path just beneath the outstretched extremities of the branches of the trees which in general correspond to the root spread. Such tunnels are, of course, devious in their course and have many branches, some of which run laterally off to join the tunnels encircling adjacent trees.

It has been suggested that furrows could be made in the sod so as to intersect some of the tunnels in the vicinity of the trees and to place poisoned bait therein. This, however, is dangerous to domestic animals who may also be attracted to the bait and as a matter of fact is in many States contra the law which prohibits placing poisoned bait in exposed places where it may be encountered by domestic animals or by harmless wild animals. Furthermore, the rodents are timid and not likely to expose themselves in an open furrow except in case of extreme hunger.

The principal objects of this invention are to provide an apparatus for operating on the sod of the ground in and about orchard trees in such fashion as to produce continuous, uninterrupted covered trenches or passages having smooth compacted bottoms on which bait deposited by the apparatus will be readily accessible to rodents inhabiting or using passages or runways burrowed by them for use in reaching the roots of the trees and which may be intersected in one or more places by the aforesaid machine-made passages, which apparatus will be easy to construct, durable, efficient in operation and may be attached for motivation to tractors or other motorized or horse drawn vehicles which may be available for this purpose. Other objects are to provide an apparatus which will open a trench in the sod of the ground without substantially interfering with the roots of the trees, which will make a clean cut with reference to intersecting rodent passages without disturbing the soil thereabout, which will hold the severed sod temporarily aloft, will compact the soil at the bottom of the trench and soil loosened from the underside of the sod so as to provide a smooth packed bottom without displacing the earth at the sides or blocking the intersecting rodent tunnels, which will attenuate the sod so that when it falls back after the apparatus moves beyond it, it will be disposed substantially above the opposite side of the trench and thereby hold the sod elevated sufficiently to maintain a clear unobstructed passage and which will deposit bait at intervals along the bottom of the trench prior to closing thereof.

As herein illustrated, a blade is employed to open the trench and has a sod penetrating edge and a lateral lifting or turning surface for tilting and turning the sod upwardly and laterally and an ironer following immediately after the blade operates on the bottom of the trench to enlarge and compact its bottom. The lateral surface of the blade holds the sod aloft until the ironer enters the open trench and the latter has a vertically rising, supporting surface which receives the elevated sod as it leaves the lateral surface of the blade, holding it elevated while the ironer operates on the bottom of the trench, compacting and smoothing down the loose earth at the bottom and any that falls or is detached from the lifted sod, and hence makes for a passage which is clear of obstructions. More specifically, the blade is a disc mounted for rotation in a vertical plane set at an angle inclined outwardly in the direction of travel of the device thus increasing the lifting force on the sod as successive portions of the disc rise from the trench. The disc is concavo-convex so that as it rotates it operates on the underside of the sod to loosen some of the soil therefrom thereby to reduce the thickness of the sod and to attenuate it. The concave side of the disc preferably, although not necessarily, faces inwardly and has a hub of smaller diameter fast to it which limits the depth of penetration of the disc and simultaneously serves as a control guide which prevents excessive tilting of the sod. The ironer is elongate, has a blunt pointed nose and a smooth generally convex underside. The ironer is arranged tandemly of the disc and its supporting surface is a flat blade or fin which rises upwardly from the top of the ironer and is continuous from end to end thereof and thereby holds the sod aloft throughout operation of the ironer so that the sod has no chance to fall or partially fall back over the trench prior to completion of the ironing operation and deposition of the bait. The bait may be deposited by hand or automatically by a tube located at the trailing end of the ironer into the wake of the ironer. When a tube is employed the delivery end of the tube is elevated with respect to the bottom of the ironer and its upper end is adapted to receive bait either by hand or from a feed hopper. When a hopper is employed a mechanical gate and an agitator may be used therewith to brush bait into the hopper funnel and release it into the upper end of the tube, the agitator and gate being operated by connection to some part of the apparatus which derives its motion from the forward progress of the apparatus, for example, the disc. The disc and ironer are made fast to a rigid frame and the latter is fastened to a tractor chassis in such fashion as to project laterally therefrom. Preferably, the frame is pivotally attached to the tractor chassis so that it may be elevated and lowered and means is provided to effect elevating and lowering of the frame.

The invention will now be described with reference to the accompanying drawings wherein:

Fig. 1 is an isometric view showing the apparatus which forms the subject matter of the invention attached to the rear end of the chassis of a tractor;

Fig. 2 is an isometric view of an orchard tree showing the ground therebeneath, the approximate location of rodent-made tunnels about the tree and the location of the covered passages as made herein intersecting the rodent tunnels;

Fig. 3 is a vertical section transversely of a trench in its initial formation as made herein at an intersection with a rodent-made tunnel;

Fig. 4 is a corresponding section in an intermediate stage of making the passage;

Fig. 8 is an elevation of a hopper feed.

Referring to Fig. 2, there is shown an orchard tree beneath which there is a rodent-made tunnel 10 shown in dotted lines, which runs in a generally circular fashion about the base of the tree at a radius which corresponds roughly to the locus of the tips of the branches which in turn corresponds roughly to the locus of the tips of the roots beneath the ground. While the rodent tunnel is shown in generally circular form, it deviates very greatly from a true circle and may have numerous branches which run toward the trunk of the tree and/or radially outward across the aisle to the base of an adjacent tree. Since the rodent-made tunnels are most apt to be concentrated as pointed out at the tips of the roots just beneath the outer extremities of the branches, passages made along the aisles between the trees just beneath the outer extremities of the branches thereof are most likely to intersect the greatest number of tunnels. Accordingly, as will be described herein, closed passages 12 are made in straight lines and in crisscross fashion just beneath the tips of the branches of the trees in which bait is deposited for attracting the rodents from their usual tunnels.

These closed passages desirably are continuous and unobstructed so that they intersect the rodent-made passages without blocking the same, have a firmly packed floor on which the bait may be distributed unmixed with loose soil and hence invitingly accessible to rodents and are resistant to collapse.

Figure 6:
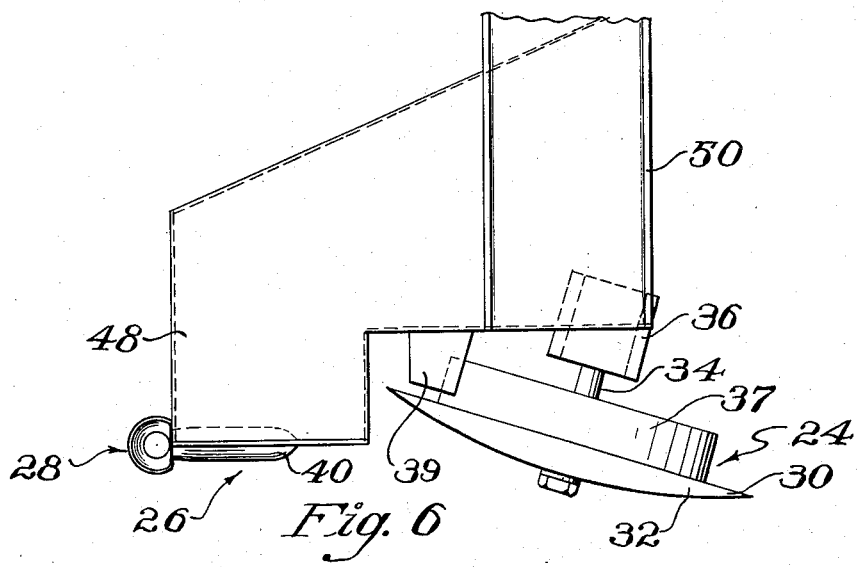
Fig. 6 is a plan view of the apparatus for making the trench.
Figure 7:
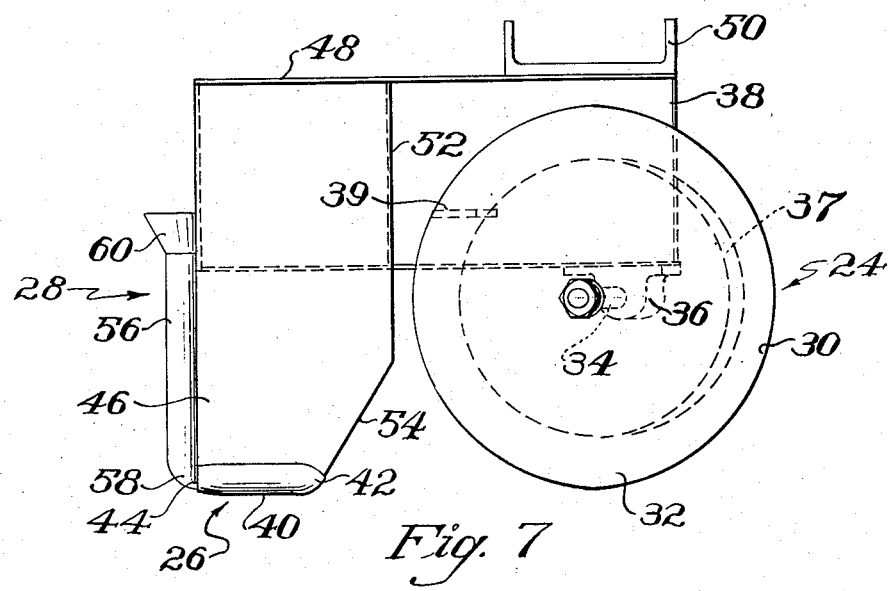
Fig. 7 is a side elevation of the apparatus.
Figure 5:
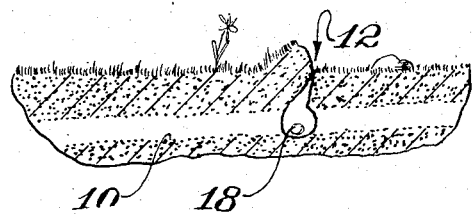
Fig. 5 is a vertical section showing the completed passage with bait deposited therein and covered at the top.

An apparatus for making these trenches and ultimately closed passages 12 is shown generally in Fig. 1, attached to the chassis 20 of a tractor 22 and comprises essentially as shown in Figs. 6 and 7, an incising member 24, an ironer 26 and bait feeding means 28. The incising member 24 has a circular cutting edge or blade 30 and is in the form of a concavo-convex disc 32 conventionally known as a coulter disc. The coulter disc is arranged to rotate in a vertical plane on a horizontally disposed axle 34, the latter being fixed in a bearing 36 which in turn is bolted to a frame iron 38, the latter being fastened to a channel iron 50. The axle 34 is inclined rearwardly so that the vertical plane in which the disc rotates toes outwardly in the direction of movement of the apparatus. An angle of about 15° is found to give the best results.

For best results the concave side of the coulter is faced inwardly with respect to the tractor, that is away from the trees although it can be operated in a reversed position, that is with the concave side facing outwardly. The disc has fast to it a hub 37 of smaller diameter. The peripheral surface of the hub has rolling contact with the surface of the sod over which the apparatus is traveling so that penetration of the cutting edge of the disc is limited by the difference in radii of the disc and hub. As the disc moves along it not only has rolling engagement with the ground but also a non-rotary upward and forward movement due to the outward toeing of its forward edge so that its rear edge skids along tilting the sod upwardly as shown in Fig. 3. The rotating concave surface of the disc has in addition to its tilting effect an abrading effect which loosens the soil clinging to the roots at the underside of the sod, detaching it and causing it to fall to the bottom of the trench. This frictional drag on the sod also attenuates it. In the absence of the hub 37 the upwardly moving inner surface of the disc would have a tendency to tilt the sod so high that it would tip over on its back and hence when it was later released it would not return to its initial position to cover the trench. The hub has therefore, in addition to its depth limiting feature, the added function of a guide or control surface which limits the upward movement of the sod so that it never reaches a point where it topples over. A scraper blade 39 is made fast to the frame iron 38 so as to have contact with the hub to scrape off soil which might cling to it.

The ironer 26 is an elongate solid cylinder 40 having a blunt, conical shape leading end or nose 42 (Fig. 7) and a tapering rear or trailing end or edge portion 44. The lowermost surface of the ironer is generally convex and is tangent to a plane which is parallel to the axis of the shaft 34 and tangent to the lowermost point of the coulter disc. The nose 42 of the ironer is bluntly conical and hence will ordinarily move over or around obstacles that it meets head-on without stalling the apparatus. The tip of the ironer lies directly behind the coulter in a vertical plane which passes through the axis of the shaft 34 of the coulter. The ironer has a vertically rising flat plate or fin 46 made fast to the top thereof which extends upwardly and forwardly therefrom and is attached to a horizontal frame plate 48 made fast to the underside of the channel iron 50. The forward or leading edge 52 of the fin 46 lies close to the trailing edge of the disc and forwardly of the nose 42 of the ironer so as to make the gap between the trailing end of the coulter and the leading end of the fin small and hence to effect a smooth continuous transfer of the elevated sod from the lateral surface of the disc as shown in Fig. 4, to the lateral surface of the fin 46. The leading edge of the fin below the center of rotation of the coulter disc has a rearwardly inclined edge portion 54, making an angle of approximately 60° with the longitudinal axis of the ironer to provide a clearance for the nose of the ironer. The inclined edge portion 54 continuously disperses grass and other debris as it is picked up by the forward moving edge of the fin so that it is not allowed to accumulate in any quantity and thereby to spread to the opposite sides of the ironer and to be wiped or pressed into the bottom and sides of the furrow together with the loose dirt as the ironer moves along the furrow.

The trailing edge of the fin 46 has attached to it a tube 56 which constitutes part of the feeding means 28 for delivering bait to the bottom of the trench in the wake of the ironer. The tube 56 has a lower end 58 which terminates substantially at the level of the longitudinal axis of the ironer so that its mouth is elevated from the bottom of the trench and an upper end which has associated therewith a funnel 60 to which bait may be supplied, either by hand or from a hopper containing a quantity of bait.

Any conventional type of hopper may be employed, an example of which is shown in Fig. 8, as consisting of a vessel 62 of generally conical shape in which may be placed bait. The lower end of the vessel has a spout 64 through which there is a vertical passage 66. A laterally extending diametrical opening 68 is made through the walls of the spout so as to intersect the passage 66 for receiving a slide plate or bar 70 which has in it an opening 72 corresponding in diameter to the passage 66. A spring 74 attached to the slide and to the spout or some other part of the apparatus normally holds the plate in such a position that the hole 72 therein is out of alignment with the passage 66 thus blocking escape of bait from the hopper 66 to the tube 56. The plate 70 has connected to it a hinged latch 76 which has a depending tooth 78 adapted to engage one at a time one of a plurality of teeth 82 on the periphery of a disc 80. The disc 80 may be made fast to a shaft 84 which is operably connected to some moving part of the apparatus which effects rotation thereof during forward progress of the apparatus, thereby intermittently to move the plate 70 in a direction to align the hole 72 therein with the passage 66 and then to release the plate and allow it to return to its blocking position. The disc 80 may, for example, be attached to the hub of the coulter. Thus, bait is delivered at fixed intervals to the feed tube only during forward progress of the apparatus. There may also be an agitator 86 in the hopper 62 arranged to be rotated therein, for example, by connection to the shaft 84.

The channel iron 50 to which the operating components of the apparatus are fastened extends horizontally and laterally to one side of the tractor chassis so that as the tractor is driven along the aisles between rows of trees the apparatus will project just under the branches of the trees and with sufficient clearance so that the operator is clear of the branches and the forward progress of the tractor is not impeded. The channel iron 50 is preferably fastened to rearwardly extending arms 88—88 pivoted on the chassis of the tractor so that the entire unit may be elevated to an out of the way position during travel to and from the orchard and may be quickly lowered into operating position for use. A connecting rod 90 pivotally attached to one of the arms 88 and provided with a suitable mechanical leverage adjacent the drive wheel of the tractor affords means for lifting and lowering the unit.

The apparatus has distinct advantages in that the coulter disc as it encounters roots, stones, or other obstacles in the ground will roll over the obstacle or by them and will have no tendency to tear or lift the roots out of the ground as would a conventional plow share and makes a clean incision with the least disturbance or damage to intersecting rodent tunnels. The closely adjacent inclined leading edge of the fin rising from the ironer prevents the tilted sod from falling back into the trench before the ironing operation is started, continuously disperses trash so that it does not accumulate and the bluntly conical nose of the ironer readily passes by and over obstacles and smooths the walls of the trench without filling the entrances of the rodent tunnels with pieces of soil.

It should be understood that the present disclosure is for the purpose of illustration only and that this invention includes all modifications and equivalents which fall within the scope of the appended claims.

I claim:

1. Apparatus for making a closed passage subjacent to the surface of ground containing matted roots, comprising a frame adapted to be attached to means for moving it bodily along the ground, a concave colter disk mounted on the frame for rotation about a horizontal axis in a plane inclined to the direction of movement of the apparatus for incising and tilting the contacted portion of the incised sod upwardly while retaining it in joined relation to the untilted portion of the sod along one side of the incision to provide an open trench, a broad thin blade fast to the frame behind the colter in a plane substantially perpendicular to a horizontal plane passing through the axis thereof, with one edge close to the rear edge of the colter so that the sod tilted by the colter slides off into engagement with the blade and is held aloft thereby, an ironer fastened to the lower part of the blade for movement along the bottom of the open trench, said ironer having a surface for operating on the bottom of the trench to compact and smooth the loose earth therein, and a feed tube at the opposite edge of the blade with its lower end adjacent the trailing end of the ironer for delivering bait in the wake of the ironer on the firmly pressed bottom of the trench, and the surface of said blade extending rearwardly from the one edge and terminating substantially contiguous to the trailing end of the ironer.

2. Apparatus for making a closed passage subjacent to the surface of sod covered ground between and about trees in an orchard, comprising a frame adapted to be attached to means for moving it bodily along the ground, a disk having concave and convex faces and a cutting edge, said disk being mounted on the frame for rotation about a horizontal axis with the plane of the cutting edge diverging from the direction of movement of the apparatus, said disk operating to penetrate the sod and tilt the contacted portion thereof upwardly while retaining it in joined relation to the untilted portion of the sod at the concave face of the disk to provide an open trench and scraping soil from the underside of the lifted sod, a broad thin fin fast to the frame in a plane substantially perpendicular to a horizontal plane passing through the axis of the disk with one edge close to the rear edge of the disk so that sod tilted by the disk substantially uninterruptedly slides into engagement with the surface of the fin and is held aloft thereby, an ironer fastened to the lower part of the fin for movement along the bottom of the open trench, said ironer having a surface for operating on the bottom of the trench to compact the loose soil, detached from the underside of the sod by the scraping action of the disk, firmly in the bottom, and a feed tube located on the frame with a portion of the tube adjacent the trailing end of the ironer for delivering bait in the wake of the ironer on the packed bottom of the trench, and the surface of the fin extending rearwardly from the one edge thereof and terminating substantially contiguous to the trailing end of the ironer.

3. Apparatus for making a closed passage subjacent to the surface of sod covered ground between and about trees in an orchard, comprising a frame adapted to be attached to means for moving it bodily along the ground, a disk having concave and convex faces and a cutting edge, said disk being mounted on the frame for rotation about a horizontal axis with the plane of the cutting edge diverging from the direction of movement of the apparatus and the concave side facing inwardly, said disk operating to penetrate the sod, tilt the contacted portion thereof upwardly while retaining it in joined relation to the untilted portion of the sod at the concave side of the disk to provide an open trench, and loosening and attenuating the sod so that the loosened soil falls into the open trench, a broad thin fin fast to the frame in a plane substantially perpendicular to a horizontal plane passing through the axis of the disk with an edge close to the rear edge of the disk and a continuous, rearwardly, extending, lateral surface so that the sod tilted by the disk uninterruptedly slides into engagement with the lateral surface of the fin and is held aloft thereby, an ironer fastened to the lower part of the fin for movement along the bottom of the open trench, said ironer having a surface for operating on the bottom of the trench to compact the loose soil detached from the underside of the sod by the scraping action of the disk, and a feed tube located on the frame with a portion of it adjacent the rear end of the ironer for delivering bait in the wake of the ironer on the closely packed bottom of the trench, and said lateral surface of the fin extending rearwardly from the one edge to at least substantially the rear end of the ironer.

4. Apparatus for making a closed passage subjacent to the surface of sod covered ground between and about trees in an orchard, comprising a frame adapted to be attached to means for moving it bodily along the ground, a disk having concave and convex faces and a cutting edge, said disk being mounted on the frame for rotation about a laterally extending, outwardly projecting, horizontal axis with the plane of the cutting edge diverging from the direction of movement of the apparatus and the convex side of the disk facing outwardly with respect to the frame, for penetrating the sod, tilting the contacted portion of the sod upwardly while retaining it in joined relation to the untilted portion of the sod at the concave face to provide an open trench, scraping the soil from the underside of the sod and attenuating the sod, a broad thin fin fast to the frame in a plane substantially perpendicular to a horizontal plane passing through the axis of the disk with an edge close to the rear edge of the disk, said fin having a lateral, rearwardly extending surface so that the sod tilted by the disk is uninterruptedly delivered from the rear edge of the disk into engagement with the surface of the fin and is held aloft thereby, an ironer fastened to the lower part of the fin for movement along the bottom of the open trench, said ironer having a surface for operating on the bottom of the trench to press and compact the loose soil detached from the underside of the sod into the bottom, and a feed tube located on the frame with a portion of it adjacent the rear end of the ironer for delivering bait in the wake of the ironer onto the closely packed bottom of the trench, and said lateral surface of the fin extending rearwardly from the one edge and terminating substantially contiguous to the rear end of the ironer.

5. Apparatus according to claim 1, wherein the ironer is an elongate body having a smooth, transversely convex surface at its underside and tapering ends.

6. Apparatus according to claim 1, wherein the lower end of the tube is elevated with respect to the bottom surface of the ironer and its upper end is adapted to receive material to be fed therethrough to the trench.

7. Apparatus according to claim 1, wherein the disk has a hub projecting laterally therefrom, for contact with the sod.

References Cited in the file of this patent

UNITED STATES PATENTS

| Number | Name | Date |
|---|---|---|
| 24,928 | Bucklin | Aug. 2, 1859 |
| 117,441 | Mettler | July 25, 1871 |
| 265,085 | Hughes | Sept. 26, 1882 |
| 271,036 | Casanova | Jan. 23, 1883 |
| 643,019 | Walton | Feb. 6, 1900 |
| 1,002,344 | Watson | Sept. 5, 1911 |
| 1,234,372 | Miller | July 24, 1917 |
| 1,262,283 | Sturrock | Apr. 9, 1918 |
| 1,513,138 | Tarnok | Oct. 28, 1924 |
| 1,808,974 | Wilkens | June 9, 1931 |
| 1,873,749 | Flanagan | Aug. 23, 1932 |
| 1,972,281 | Walling | Sept. 4, 1934 |
| 2,143,543 | Collins | Jan. 10, 1939 |
| 2,232,298 | Wooley et al. | Feb. 18, 1941 |
| 2,269,724 | Linkogel | Jan. 13, 1942 |
| 2,598,121 | Hanibal | May 27, 1952 |

FOREIGN PATENTS

| Number | Country | Date |
|---|---|---|
| 13,555/33 | Australia | July 20, 1934 |
| 25,773 | Great Britain | 1912 |
| 266,435 | Italy | July 28, 1929 |
| 390,249 | Germany | Feb. 15, 1924 |
| 391,347 | France | Aug. 27, 1908 |
| 567,013 | Great Britain | Jan. 24, 1945 |
| 596,790 | France | Aug. 17, 1925 |
| 641,744 | Great Britain | Aug. 16, 1950 |